May 7, 1963 P. W. KING ET AL 3,088,270
LABORATORY STOP CLOCK
Filed Jan. 18, 1960 4 Sheets-Sheet 1

INVENTORS
PHILLIP W. KING
RICHARD J. KAVANAUGH
WILLIAM A. KNECHT
BY
Pennie, Edmonds, Morton, Barrows & Taylor
ATTORNEYS

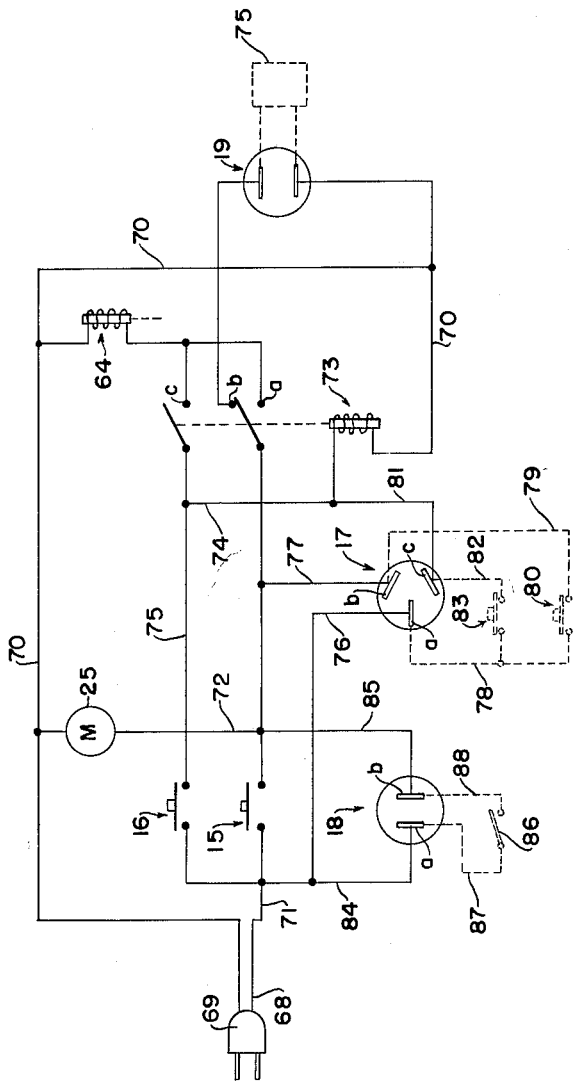

May 7, 1963 P. W. KING ET AL 3,088,270
LABORATORY STOP CLOCK
Filed Jan. 18, 1960 4 Sheets-Sheet 3

INVENTORS
PHILLIP W. KING
RICHARD J. KAVANAUGH
WILLIAM A. KNECHT
BY
Pennie, Edmonds, Morton, Barrows & Taylor
ATTORNEYS

INVENTORS
PHILLIP W. KING
RICHARD J. KAVANAUGH
WILLIAM A. KNECHT
BY
ATTORNEYS

United States Patent Office 3,088,270
Patented May 7, 1963

3,088,270
LABORATORY STOP CLOCK
Phillip W. King, Meriden, Richard J. Kavanaugh, Bristol, and William A. Knecht, New Hartford, Conn., assignors to Consolidated Electronics Industries Corp., Waterbury, Conn., a corporation of Delaware
Filed Jan. 18, 1960, Ser. No. 3,088
13 Claims. (Cl. 58—39.5)

The present invention relates to timing devices, and more particularly, to a novel, improved and simplified electrical stop-clock timer adapted particularly for laboratory use, for example.

In connection with various laboratory experiments and other investigations, it frequently is desirable to utilize a precision timing device, for recording elapsed time and/or for controlling the duration of a period of operation of certain equipment. Of course, a variety of apparatus is available for this purpose, but known apparatus usually is characterized by substantial complexity and excessive cost, which tends to limit the usefulness of such known apparatus for general application in small laboratories, for example.

Broadly speaking, the present invention seeks to provide a precision, electric stop-clock timer, for laboratory and like uses, which is highly simplified and compact in nature and which may be manufactured and made available to the market at a low cost. Notwithstanding its overall simplicity and economical construction, however, the stop-clock of the invention is characterized by the precision in operation, flexibility of application and facility of control, either remote or local.

One of the important specific features of the invention resides in the provision of a precision stop-clock whose indicator means are driven by an instant start and stop inductor motor, designed for synchronous operation, which is connected through suitable gearing to one or more hands or indicators of a timer, permitting accurate registration or indication of elapsed time in accordance with the initiation and termination of an electrical energy supply. Thus, the timer is started immediately by the closure of a switch and stopped immediately by opening of a switch. Further, in this connection, the improved apparatus includes the appropriate means for connection to an external switching device, so that the stopping and starting of the timer is controlled remotely, either manually or by means of another apparatus.

Another specific, advantageous feature of the invention resides in the provision of a stop-clock timing apparatus of the type and having the general characteristics described above, which includes circuit means associated with the timer motor and affording a connection to a remotely positioned, electrically controlled device. Accordingly, where desirable or expedient, an auxiliary device may be started and stopped in accordance with the starting and stopping of the timer, the elapsed time of operation of the auxiliary device being recorded automatically by the timer indicator at the instant timer operation is discontinued.

For a better understanding of the above and other novel and advantageous features of the invention, reference should be made to the following detailed description and to the accompanying drawings, in which:

FIG. 2 is a simplified, schematic representation of a circuit arrangement incorporated in the device of FIG. 1;

Figure 1:
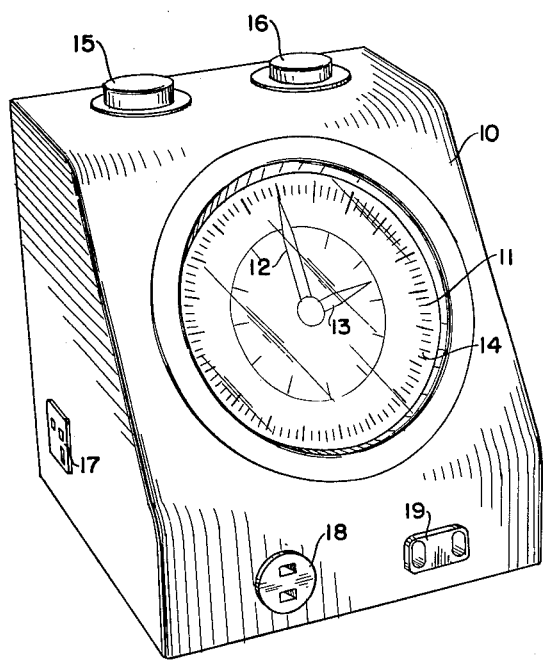
FIG. 1 is a front, perspective view of an advantageous form of stop-clock timer incorporating the various features of the invention.

Referring now to the drawings, and initially to FIG. 1 thereof, an advantageous form of the invention comprises an enclosed housing 10 having a slanting front surface provided with an opening, typically covered with a crystal 11 constituting a viewing window. Within the housing 10 is a timer mechanism, to be described, which drives suitable pointers or indicators 12, 13 relative to an appropriate indicating dial 14. In the illustrated apparatus, the indicators 12, 13 may be arranged to rotate at one revolution per second and one revolution per minute, respectively, it being understood, of course, that a suitable indicator may be provided, if desired, to indicate hours, or any other convenient increment of time.

Externally, the device of FIG. 1 is provided at the top with a depressible start switch button 15 and a depressible reset switch button 16. When the device is conditioned for operation, a timing period is initiated and maintained by depressing and holding down the switch button 15. When the button 15 is released, the indicators 12, 13 stop instantly, indicating the elapsed time from a zero or starting position. Resetting of the indicators to zero to be described in greater detail, is effected by momentarily depressing the reset switch button 16.

In the form of the apparatus illustrated in FIG. 1, appropriate outlet connection sockets 17, 18, 19 are provided about the base of the housing 10, suitably exposed for reception of mating plugs (not shown). As will be described in greater detail, the socket 17 provides connections for remote control circuitry whereby the functions of the switch buttons 15, 16 are bypassed in parallel, enabling complete operation of the apparatus to be accomplished at a remote location. The socket 18 is arranged to receive circuit means by bypassing the functions of the switch button 15 in parallel, whereby the timer may be started and stopped from a remote location, although resetting of the indicators to zero requires depressing of the switch button 16. The socket 19 constitutes a power outlet, which is activated only when the timer is operating. This socket may be adapted to receive a conventional, standard size 115 volt plug, for example, associated with an auxiliary device or apparatus, so that the auxiliary apparatus is operated only during periods when the timer is running. As will be readily understood, by means of the various described external connections, an auxiliary apparatus may be controlled and timed through the operation of the timer itself, or alternatively, the operation of the timer may be controlled in accordance with the operation of the auxiliary device.

Figure 4:
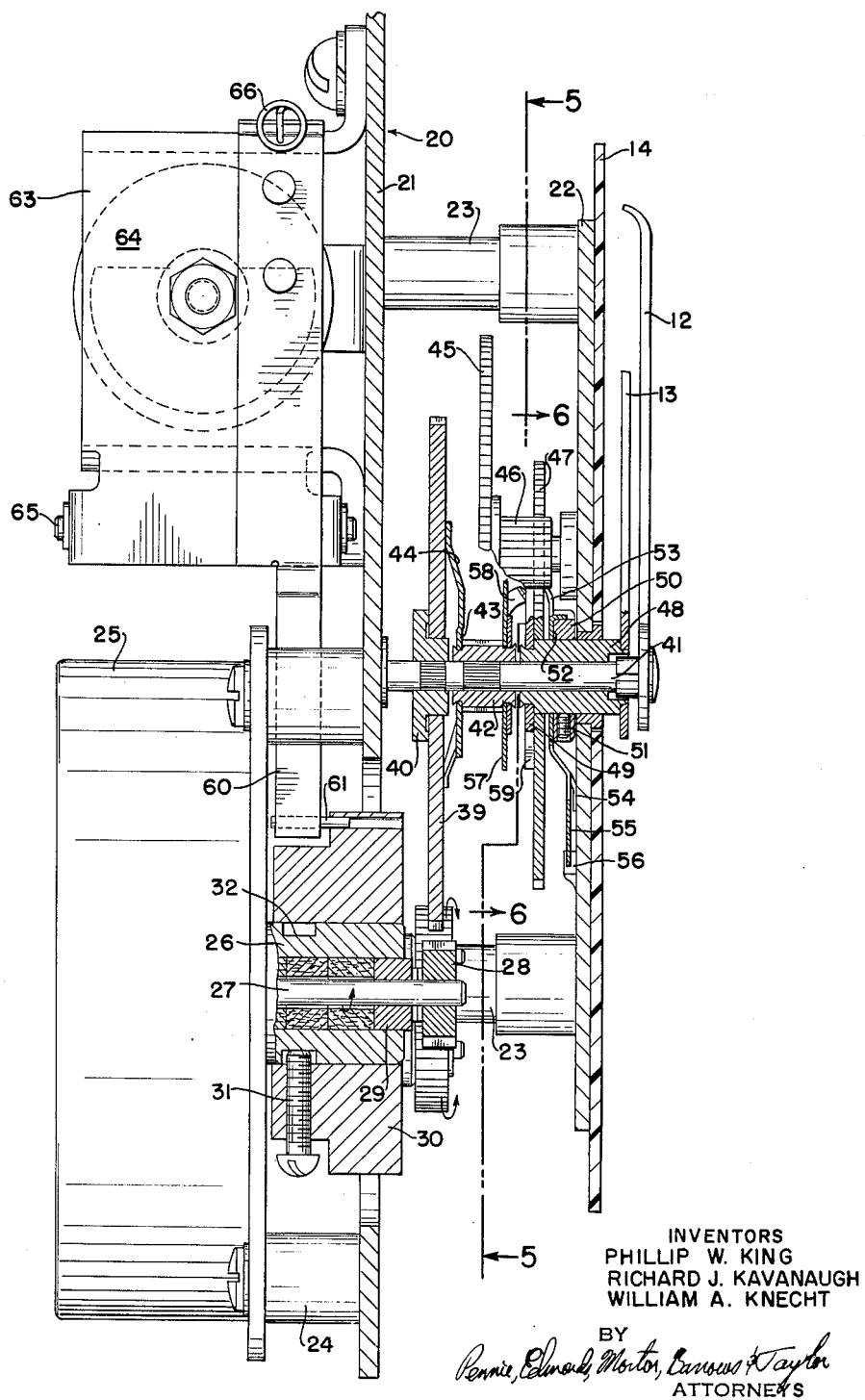
FIG. 4 is an enlarged, fragmentary, cross-sectional view, illustrating certain details of the operating mechanisms of the device of FIG. 1.
Figure 5:
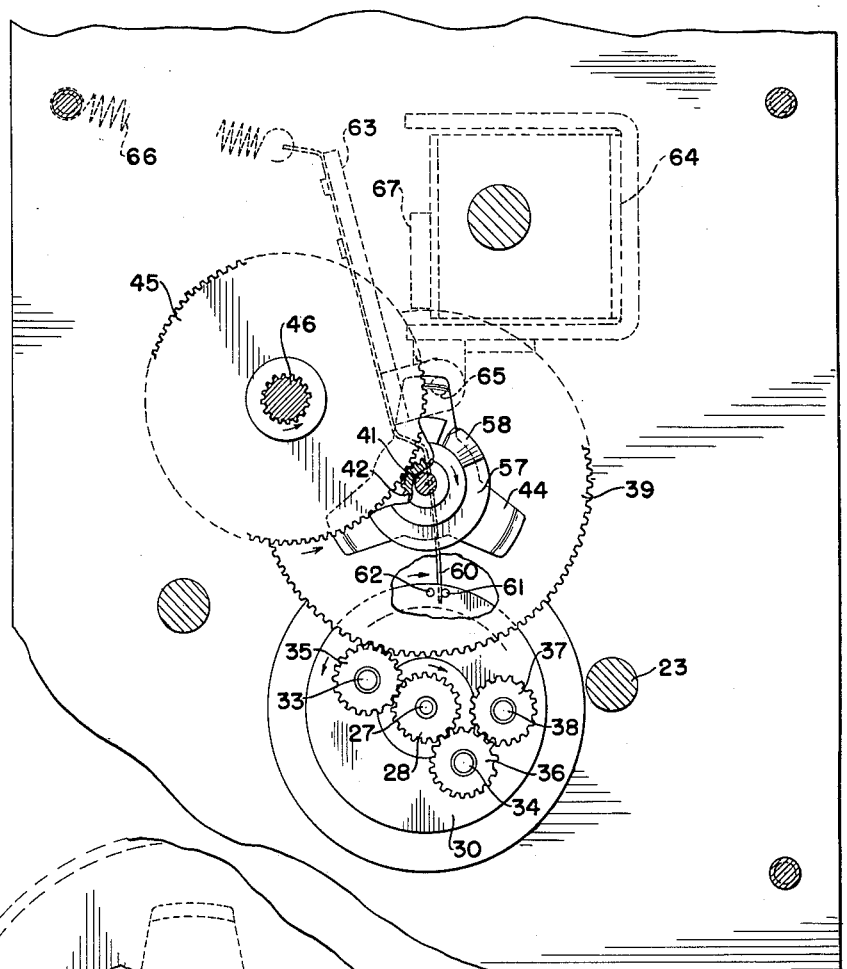
FIGS. 5 and 6 are fragmentary, cross-sectional views taken generally along the lines 5—5, 6—6, respectively, of FIG. 4.
Figure 6:
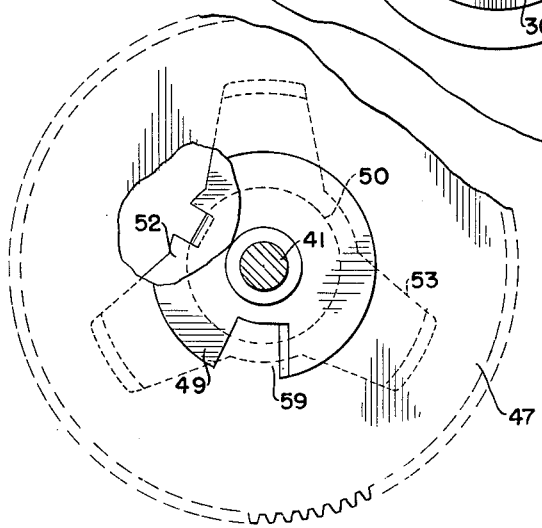

Referring now more particularly to FIGS. 4 and 5, the operating mechanism of the new stop-clock timer includes a frame 20 comprising spaced plates 21—22 separated by suitable posts 23. Mounted behind the back plate 21, on suitable spacer posts 24, is a small, synchronous, inductor motor 25 of a design capable of substantially instantaneous starting and stopping. Advantageous forms of such motors are shown and described in the copending applications of Loisius J. A. Van Lieshout and William D. Riggs, Serial No. 571,632, now Patent No. 2,981,855, and Serial No. 798,199, now Patent No. 3,014,141, filed March 15, 1956 and March 9, 1959, respectively.

A hollow cylindrical bushing 26 projects forward from the motor 25 in surrounding relation to the forwardly projecting rotor shaft 27 of the motor. The shaft 27 projects beyond the end of the bushing 26 and mounts a driving pinion 28, as shown, for rotation with the shaft. Suitable bearing means 29 are received within the bushing 26 to support and journal the outer portion of the motor shaft, if desirable or expedient.

In accordance with one of the specific aspects of the invention, a transmission collar 30, of generally circular form in the illustrated instance, is rotatably mounted upon and generally surrounds the bushing 26. The collar 30 has received therein means, such as a locking screw 31, which projects radially inward from the collar and is received in an annular groove 32 in the bushing. Accordingly, in the assembled apparatus, the collar 30 is freely rotatable on the bushing while being substantially immovable with respect thereto in axial directions. As shown best in FIG. 5, the transmission collar 30 is provided at spaced points with a pair of stub shafts 33, 34 which project axially, parallel to the motor shaft 27, and mount idler pinions 35, 36, respectively. Both of the idler pinions 35, 36 are meshed with the main drive pinion 28 for rotation therewith. The pinion 36 alone, however, is arranged to mesh with a reversing pinion 37 mounted on a stub shaft 38 projecting axially of the transmission collar 30. The pinions 35, 37 constitute the output elements of a reversing transmission and, as will be described, these pinions are alternatively and selectively engageable with a gear 39, constituting the input to the gear train mechanism of the indicator hands.

As shown best in FIG. 4, the gear 39 is mounted rotatably on a hub 40 fixed to the main indicator shaft 41 which projects forward of the dial face 14 and mounts the indicator 12. Fixed to the shaft 41, adjacent to the gear 39, is a pinion 42, which has fixed to the rearward end thereof a spring 43 having a plurality of radial fingers 44. The spring-fingers 44 press against the gear 39, urging it into frictional engagement with the hub 40, causing the shaft 41 and gear 39 to rotate together and in the absence of substantial restraining force. The pinion 42 drives a relatively large diameter gear 45 (see FIG. 5), which has fixed thereto a smaller diameter pinion 46 meshing with and driving a large diameter gear 47. The gear 47 is mounted rotatably upon the inner or rearward end of a bushing 48, being positioned on the bushing by a disc or collar 49 which is secured to the end of the bushing.

On the outside of the gear 47, a small collar 50 is secured to the bushing 48, as by means of a set screw 51, and the bushing and the collar 50 has secured thereto a spring assembly 52, including spring-fingers 53 pressing rearward against the gear 47 and a spring-finger 54 pressing forward against the frame plate 22. A stop arm 55 projects radially from the spring assembly 52 and is adapted to engage a lug 56 on the front frame plate when the bushing 54 is in a predetermined zero or starting position, in which the indicator 13, fixed to the projecting forward end of the bushing points to zero.

The fingers 53 of the spring 52 press the gear 47 into frictional contact with a disc 49, so that the gear, disc and the bushing 48 rotate in unison in the absence of substantial restraining force.

In a normal timing operation, the input gear 39 to the timing train is driven by one of the pinions 35, 37 (typically the pinion 35), driving the shaft 41 and indicator 12 at a desired speed (typically one revolution per second) by reason of the frictional contact between the gear 39 and the hub 40. The indicator 13 is driven at a lower speed (typically one revolution per minute or one revolution per hundred seconds, for example) through the train including the shaft 41, pinion 42, gears 45, 46, gear 47, disc 49 and bushing 48. The gear 47 and bushing 48 rotate in unison, normally.

Forward or timing operation of the apparatus is accomplished by driving the main input gear 39 in a clockwise direction, advantageously at the indicated speed of one revolution per second. The hand or indicator 13, and any additional indicators, are driven through appropriate gear trains, at desired speeds, depending upon the nature and timing capacity of the apparatus. Resetting of the indicator hands to their starting or zero positions is accomplished in a manner similar to that described in the J. J. Ambrozaitis Patent No. 2,869,639, issued January 20, 1959. To this end, a spring disc 57 is secured to the forward end of the intermediate pinion 42, mounted on the main shaft 41, and has a spring finger 58, extending forward therefrom and engaging with light pressure the disc 49 secured to the front bushing 48. As illustrated in FIG. 4, the disc 49 is provided with a radial slot 59 (shown on the bottom of the disc in FIG. 4), which is adapted to be contacted and/or engaged by the spring-finger 58, upon relative rotation of the disc 57 with respect to the disc 59.

As shown in FIG. 5, the spring-finger 58 extends forward and in a counterclockwise direction from the disc 57. Accordingly, during normal or timing operation of the mechanism, the finger 58 merely wipes across the slot 59 during rotations of the gear 39 and pinion 42, which take place at higher speed than rotations of the gear 47. During resetting of the mechanism, however, when the input gear 39 is rotated in a counterclockwise direction, the spring-finger 58 at some time during the first revolution of the gear 39 and disc 57, engages in the slot 59 and causes the disc 49 to rotate along with the disc 57.

The orientation of the slot 59 in the reset disc 49 is such, in relation to the indicator 13, that the indicators 12, 13 are aligned at the instant of engagement of the slot 59 by the spring-finger 58. Accordingly, during the reset, the high speed indicator 12 sweeps around the dial until it becomes aligned with the lower speed indicator 13, after which both of the indicators 12, 13 continue sweeping toward the zero or starting position at the higher speed of rotation of the indicator 12. During this portion of the reset movement the lower speed indicator 13 will, of course, be rotating at a higher speed than its driving gear 47. Accordingly, the gear 47 slips with respect to the bushing 48 as permitted by the light, frictional connection provided by the spring-finger 53.

When the aligned indicators 12, 13 reach the zero or starting position, the reset finger 55 engages the lug 56, stopping further rotation of the bushing 48 and indicator 13, and stopping rotation of the high speed indicator 12, as well, by reason of the engagement between the spring-finger 58 and the disc 49.

Continued rotation of the input gear 39 in a resetting direction, after both of the indicators 12, 13 have been stopped at the zero point, is accommodated by slippage between the gear 39 and the hub 40. Such slippage is permitted by reason of the frictional contact between the gear 39 and hub 40, imparted by the pressure of the spring-fingers 44. In this respect, it will be understood that the frictional torque between the input gear 39 and the hub 40 is at least slightly greater than the torque required to effect slippage between the gear 47 and the bushing 48. This is necessary to avoid premature slippage between the gear 39 and hub 48, during the interval when the indicators 12, 13 are aligned and are moving together toward the zero position at the speed of the indicator 12.

As will be apparent, the above-described mechanism for driving and resetting the indicators 12, 13 permits both the indicators to be reset to zero during the theoretical maximum period required for the high speed indicator 12 to make two revolutions. In the illustrated apparatus, this theoretical maximum period would be two seconds, and this would occur only where the full capacity of the timer had been utilized in the previous timing period. Normally, substantially less than the two second theoretical maximum period is required to effect reset.

In accordance with one aspect of the invention, a novel and simplified arrangement is provided for effecting reversal of the input motion to the gear 39, for timing and resetting operations. Thus, as illustrated in FIG. 5, for example, rotation of the main drive pinion 28 in a clockwise direction will effect clockwise rotation of the input gear 39 when a drive connection is established between the pinion 28 and gear 39 through the idler gear 35. This is accomplished in the new apparatus by rotating the collar 30 clockwise to bring the pinion 35 into mesh with the input gear 39. Reverse or resetting operation is effected, on the other hand, simply by rotating the collar 30 in a counterclockwise direction so that the input gear 39 is meshed with the reversing pinion 37.

To control the positioning of the collar 30 in the desired manner, the apparatus of the invention incorporates a novel mechanism, including a solenoid actuated leaf spring 60, the downwardly projecting free end of which extends between two pins 61, 62 projecting rearwardly from the collar 30. The upper end of the spring is secured rigidly to the arm 63 of a solenoid 64, and the arm is pivoted at the lower edge of the solenoid, at 65, and normally is urged to pivot in a counterclockwise direction, as viewed in FIG. 5, by means of a spring 66.

When the solenoid 64 is deenergized, the leaf spring 60 is pivoted to the right, rotating the collar 30 in a clockwise direction and maintaining the idler pinion 35 resiliently in engagement with the input gear 39. Energization of the solenoid causes the arm 63 to be drawn in a clockwise direction, toward the core 67 of the solenoid, and this swings the leaf spring 60 to the left, rotating the collar 30 in a counterclockwise direction. This swings the reversing pinion 37 into engagement with the input gear 39 and maintains the gears resiliently in meshing relation.

The new reversing arrangement is advantageous in that it does not require reversal of the motor 25, which results in various operating advantages. At the same time, the inherent simplicity and economy of the reversing transmission mechanism is such that the overall cost of the unit may be maintained at a minimum. In respect of the reversing mechanism, substantial economies are realized by utilizing a solenoid operated spring member to swing the transmission collar 30 clockwise or counterclockwise as desired. Since substantial over-travel of the solenoid arm 63 is accommodated by the spring 60, precision need not be observed in the manufacture and assembly of the actuating mechanism, although substantial precision and smoothness is realized in the operation of the transmission mechanism as a whole. Referring now particularly to FIG. 2, the operating circuitry of the new timer advantageously may include a suitable lead-in-cord 68 connected at its end to a plug 69 adapted to be coupled to a conventional power source outlet. When the plug 69 is properly coupled, one side of the motor 25 is connected to the source through a conductor 70, while the other side is selectively connected through the source to a conductor 71, the start switch button 15 and a conductor 72. Accordingly, when the switch button is depressed, the motor is energized and set into operation.

Resetting of the indicators to zero requires energization of the motor 25 along with energization of the reset solenoid 64. To this end, there advantageously is provided a reset relay 73 the coil of which is connected at one side to the conductor 70 and at the other side through conductors 74, 75 and the reset switch button 16 to the conductor 71. When the reset button 16 is depressed, a circuit is completed to the reset relay coil, energizing the relay and closing normally open contacts 73a, 73c. As long as the switch button 16 remains depressed, the closing of contacts 73c completes a circuit through the reset relay 64, energizing the relay and shifting the transmission mechanism to a reverse or reset condition. Simultaneously, a circuit is completed through contacts 73c and contacts 73a to the motor 25, energizing the latter to effect the desired reset motion.

For controlling the operation of an external, electrically controlled device 75, the timed outlet socket 19 is connected in parallel with the motor 25 through normally closed contacts 73b of the reset relay. Accordingly, when the start switch button 15 is depressed, power is available at the outlet 19 for operating the external or auxiliary device 75 during the timed period. Release of the button 15 immediately deenergizes the motor 25 and opens the circuit to the outlet socket 19, so that the operation of the device 75 ceases simultaneously with the termination of the timing period. During reset, when the reset switch button 16 is depressed, the circuit to the outlet socket 19 will be open, even through the motor 25 is energized, by reason of the energization of the reset relay 73 and the opening of the contacts 73b thereof.

In order to effect remote control of the timing apparatus, the outlet socket 17 is provided with connections arranged in shunt relation to the start and reset switches 15, 16. Thus, conductors 76, 77, leading to terminals 17a, 17b of the remote control socket are arranged to shunt the start switch 15 when connected through suitable external conductors 78, 79 and an external start switch 80. Likewise, conductors 76 and 81 are arranged in shunt relation to the reset switch 16 when conductors 78, 82 are connected to socket terminals 17a, 17b, respectively and are connected by a remote reset switch 83.

Simple starting and stopping of the timer from a remote position, as in connection with the operation of an apparatus whose running time is to be recorded, may be accomplished using the socket 18 whose terminals 18a, 18b are connected by conductors 84, 85 in shunt relation to the start switch 15. A remotely positioned switch 86 may be connected to the terminals 18a, 18b through conductors 87, 88, respectively to complete the shunt circuit. Actually, the remote control circuit comprising conductors 76, 77 and 78, 79, along with switch 80, may be used in the same capacity as the circuit including the socket 18 and the external switch 86. However, it has been found to be more convenient, in many cases, to provide separate socket connections.

Figure 3:
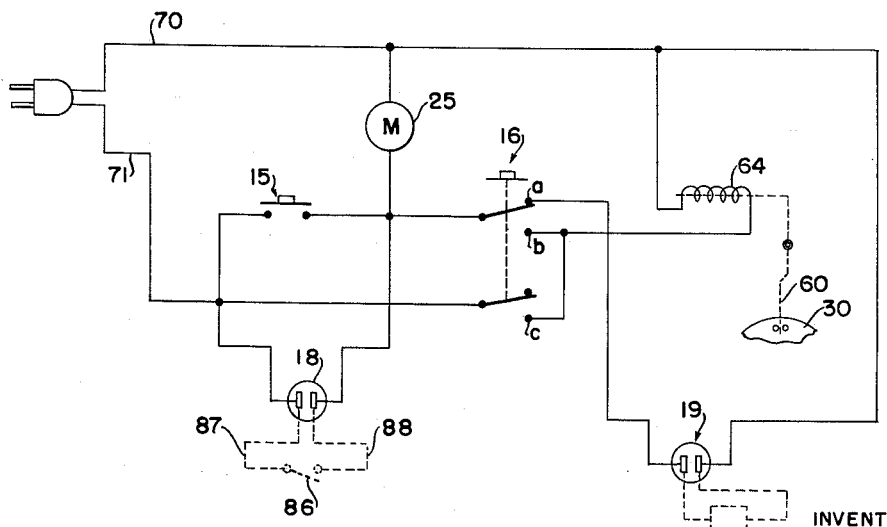
FIG. 3 is a simplified, schematic representation of a modified form of circuitry, which may be incorporated in the device of FIG. 1.

A more simplified circuit arrangement is illustrated in FIG. 3, wherein reference numerals corresponding to those used in FIG. 2 are applied to corresponding elements. There, the motor 25 is adapted to be connected to the source conductors 70, 71 through the start switch button 15. The "timed outlet" socket 19 is connected in parallel with the motor, through normally closed contacts 16a of a reset switch 16, so that power is available at the socket 19 whenever the motor 25 is in operation during a timing period. To effect reset, the reset switch 16 is depressed, opening contacts 16a and closing contacts 16b, 16c. This opens the circuit to the "timed outlet" socket 19 and completes a circuit through contacts 16b and 16c to the motor 25. Simultaneously (or slightly before), a circuit is completed through contacts 16c to the reset solenoid 64, whereby the transmission collar 30 is rotated to a reverse or reset position. The "external run" socket 18 is connected in shunt relation to the start switch 15 through external conductors 87, 88 and switch 86.

A significant aspect of the improved circuit arrangement of the invention resides in the provision of a double pole reset switch arrangement for supplying power to the reset solenoid 64 and the motor 25. As will be observed in FIG. 3, for example, energizing potential for the reset solenoid is supplied directly through contacts 16c, while energizing potential for the motor 25, during reset, is supplied through contacts 16b, in addition to contacts 16c. This assures that the reset solenoid 64 will be energized, at the latest, simultaneously with the motor 25, and positively avoids the undesirable consequences of energizing the motor 25 first. With the described circuitry, it is practical to use an inexpensive, slow-make reset switch 16, whereas other arrangements would require more complex and costly switch means to assure simultaneous contact closure. The same considerations apply, of course, in respect of the reset solenoid 73 in the circuit of FIG. 2.

As will appear in the circuit of FIG. 3, the "remote control" socket is omitted. Likewise, the reset relay is omitted, as the function of this latter element is not required where circuitry for remote reset of the timer is not provided.

The apparatus of the invention is particularly advantageous in respect of its substantial accuracy, wide versatility, simplicity of operation and economy of manufacture. This results in large part from the use of a unidirectional, synchronous, inductor motor adapted for instant starting and stopping in response to the application for removal of energizing potential, in combination with the highly simplified yet wholly reliable reversing mechanism, enabling the indicator means quickly to be reset to zero or starting positions.

Operation of the timer is made extremely simple by providing push button switches for timing and reset so that the manipulations required for normal, manual operation of the timer are reduced to a minimum. Moreover, simplified shunt circuit arrangements are provided to perform the functions of the start and reset switches at a location remote from the timer, enabling the timer to be used in a wide variety of situations. Simplified circuit arrangements also are provided whereby the duration of operation of an associated apparatus may be made to correspond to the period indicated by the timer. Thus, an associated, electrically operated apparatus may simply be plugged into the housing of the new timer and automatically will be energized when the start switch 15 is depressed. The associated apparatus also will be deenergized simultaneously with the timer motor, so that the period of operation may be ascertained and/or controlled.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. In a resettable stopclock mechanism comprising a frame, a constant speed, unidirectional motor mounted on said frame, indicator means movably mounted on said frame to be driven by said motor, reversible drive means interconnecting said motor and indicator means, and reversing control means for said stopclock mechanism, the improvement in said reversing control means which comprises a solenoid actuator mounted on said frame for reversing said drive means, stopclock starting and stopping circuit means including a first normally open switch mounted on said frame for selectively energizing said motor, and stopclock reset circuit means including a second normally open switch mounted on said frame for simultaneously energizing said motor and said solenoid, each of the contacts of said stopclock reset circuit means being in the energizing circuit for said solenoid and being in the energizing circuit for said motor whereby, upon closure of said stopclock reset circuit means, said solenoid is reliably energized at least as early as said motor.

2. The stopclock mechanism of claim 1, which includes remote starting and stopping circuit means, including a plug connector mounted on said frame, connected in parallel to said first switch for energizing said motor from a point remote from said frame.

3. The stopclock mechanism of claim 1, which includes power circuit means connected in parallel to said motor and including a power plug connector mounted on said frame, said power circuit means providing a source of electrical power for operation of a remotely stationed apparatus during periods when said motor is energized.

4. The stopclock mechanism of claim 3, in which said power circuit means includes normally closed contacts of said second switch, whereby said power circuit is opened upon actuation of said second switch regardless of the condition of said first switch.

5. The stopclock mechanism of claim 1, which includes a relay actuated by said second switch to complete said second circuit means and energize said solenoid, and remote control circuit means including a remote control plug connector mounted on said frame and circuit means connected thereto in parallel to said first and second switches.

6. The stopclock mechanism of claim 1, in which said second switch includes two sets of contacts, and said reset circuit means comprises a solenoid energizing circuit including one set of said contacts, and a motor energizing circuit including both sets of said contacts in series.

7. The stopclock mechanism of claim 6, in which said solenoid energizing circuit includes, in series, a conductor leading from a source, said one set of contacts, and said solenoid, and said motor energizing circuit includes, in series, said conductor, said one set of contacts, the other set of said contacts, and said motor.

8. In a resettable stopclock mechanism comprising a constant speed, unidirectional motor, movable indicator means movably mounted to be driven by said motor, and drive means interconnecting the motor and indicator, the improvement in said drive means comprising a drive pinion on said motor, idler and reversing pinions driven by said drive pinion and alternatively engageable with said indicator means, support means mounted about the shaft of said motor for limited rotational movement about the axis of said shaft, said support means movably mounting said idler and reversing pinions for alternative engagement with said indicator means, a controllably movable leaf spring acting on said support means, said leaf spring having first and second alternative positions in which it is operative to urge said idler and reversing pinions into engagement with said indicator means, spring means urging said leaf spring into said first alternative position, solenoid means operative when energized to urge said leaf spring into said second alternative position, and reversing control means for selectively energizing said solenoid.

9. The resettable stopclock mechanism of claim 8 in which said solenoid means includes a pivoting armature and an energizable core, said armature being alternatively urged in the direction of said first alternative position by said spring means and in the direction of said second alternative position by said core upon the energizing thereof.

10. The resettable stopclock mechanism of claim 9 in which said leaf spring is affixed to said armature for pivotal movement therewith.

11. A gear changing mechanism for resettable stopclocks and the like comprising idler and reversing pinions driven by driving means and alternatively engageable with an output pinion, support means movably mounting said idler and reversing pinions for engagement with said output pinion in first and second alternative operating positions, a movable leaf spring operatively associated with said support means to urge said idler and reversing pinions selectively into said first and second operating positions, and control means mounting said movable leaf spring in cantilever fashion with its free end projecting toward said support means, means maintaining the free end of said leaf spring in operative engagement with said support means, means mounting said control means for movement in directions to move said leaf spring alternatively in the directions of said first and second operating positions, thereby alternatively engaging said idler and reversing pinions with said output pinion in said first and second operating positions.

12. In a gear changing mechanism for resettable stopclocks and the like comprising idler and reversing pinions driven by a driving means and alternatively engageable with an output pinion, support means movably mounting said idler and reversing pinions for engagement in a first alternative and a second alternative position respectively with said output pinion, spring means urging said support means toward said first alternative position, and solenoid means urging said support means toward said second alternative position, the improvement in which said solenoid means includes a pivoting armature and an energizable core, and a leaf spring is affixed to said armature for pivotal movement therewith, said leaf spring urging said support means into said second alternative position upon the energizing of said core.

13. The gear changing mechanism of claim 12 in which said spring means includes a biasing spring urging said armature in the direction of said first alternative position, whereby said leaf spring urges said support means into said first alternative position upon the deenergizing of said core.

References Cited in the file of this patent
UNITED STATES PATENTS

| | | |
|---|---|---|
| 2,046,412 | Reynolds | July 7, 1936 |
| 2,085,849 | Dollison et al. | July 6, 1937 |
| 2,220,813 | Derungs | Nov. 5, 1940 |
| 2,777,280 | Petters | Jan. 15, 1957 |
| 2,795,965 | Hinton | June 18, 1957 |
| 2,836,073 | Masters | May 27, 1958 |
| 2,869,639 | Ambrozaitis | Jan. 20, 1959 |
| 2,985,029 | Schneider | May 23, 1961 |